United States Patent [19]

Adams, Jr.

[11] 4,132,416
[45] Jan. 2, 1979

[54] ROTATING ELEMENT FLUID SEAL FOR CENTRIFUGAL COMPRESSOR

[75] Inventor: Maurice L. Adams, Jr., Pittsburgh, Pa.

[73] Assignee: Westinghouse Electric Corp., Pittsburgh, Pa.

[21] Appl. No.: 607,008

[22] Filed: Aug. 22, 1975

Related U.S. Application Data

[62] Division of Ser. No. 398,352, Sep. 18, 1973, Pat. No. 3,927,890.

[51] Int. Cl.² ............................................. F16J 15/44
[52] U.S. Cl. ........................................ 277/18; 277/32; 277/53; 277/74
[58] Field of Search ........................ 277/17, 18, 74, 75, 277/32, 53

[56] References Cited

U.S. PATENT DOCUMENTS

| | | | |
|---|---|---|---|
| 3,162,451 | 12/1964 | Brose | 277/67 X |
| 3,236,529 | 2/1966 | Heim | 277/18 X |
| 3,292,847 | 12/1966 | Herrick | 277/17 X |
| 3,392,910 | 7/1968 | Tanzberger | 277/53 X |
| 3,519,277 | 7/1970 | Crocker | 277/25 |

*Primary Examiner*—Richard E. Aegerter
*Assistant Examiner*—L. Footland
*Attorney, Agent, or Firm*—E. C. Arenz

[57] ABSTRACT

A dynamic seal between the high pressure discharge chamber of a centrifugal gas compressor and a sump chamber in which the driving machinery for the impeller of the compressor is contained, the sump chamber in normal operation being maintained at substantially the same pressure as the pressure at the inlet of the compressor impeller is formed by the opposing faces of a seal stator and a seal rotor, the seal being vented at an intermediate location along the axial extent of the seal inwardly through the rotor and to the space at the inlet or suction side of the impeller.

1 Claim, 5 Drawing Figures

ROTATING ELEMENT FLUID SEAL FOR CENTRIFUGAL COMPRESSOR

This is a division of application Ser. No. 398,352 filed Sept. 18, 1973, now U.S. Pat. No. 3,927,890.

CROSS REFERENCE TO RELATED APPLICATION

A seal arrangement which in some respects and in certain environments is considered to provide improved performance relative to a seal embodying the basic concept of this patent application is claimed in Adams and Raimondi U.S. patent application Ser. No. 398,351, now U.S. Pat. No. 3,927,889.

BACKGROUND OF THE INVENTION

1. Field of the Invention

This invention pertains to the art of rotary or dynamic seals particularly useful in the field of centrifugal refrigerant gas compressors.

2. Description of the Prior Art

U.S. patents of which applicant is aware and which have some similarities with respect to seals and/or venting passages are: U.S. Pat. No. 838,744; U.S. Pat. No. 3,392,910; U.S. Pt. No. 3,480,284; U.S. Pat. No. 3,493,169; U.S. Pat. No. 3,647,313. It is applicant's view that the teachings in these patents do not anticipate or make obvious the invention claimed herein.

From the standpoint of structural similarities of certain of the parts, the closest prior art which applicant is aware is the centrifugal refrigerant compressor units currently produced by applicant's assignee. These devices provide an environment in which applicant's invention finds one of its most useful applications. The general arrangement of the centrifugal compressor impeller and shaft assembly and the assembly including the driving motor, sump chamber in which the drive train connecting the motor to the impeller is located and the general casing arrangement, are shown in U.S. Pat. Nos. 3,601,501 and 3,619,086, to which reference should be had for a full understanding of one general construction of a centrifugal refrigerant compressor in which the present invention is incorporated.

The present seal between the high pressure discharge space and the sump chamber on the opposite side of the wall separating these spaces is provided by a seal rotor and seal stator providing an ordinary serrated bushing type seal. The leakage of refrigerant gas from the high pressure discharge chamber side through such a seal to the sump chamber, which is maintained at substantially the same pressure as the suction pressure to the compressor inlet by venting the sump chamber to the inlet side of the impeller through an oil-refrigerant separator and oil filter arrangement, is sufficiently high with the relatively small volume sump chamber used on the relatively compact centrifugal compressor assembly, that periodically the system must be shut down to permit oil which has accumulated in the oil filter accumulator to be returned to the sump chamber. The excessive rate of refrigerant gas leakage from the high pressure side to the sump chamber creates the problem which this invention is intended to solve. A further explanation of the arrangement as a whole and the advantages accruing from the improved seal arrangement according to this invention will be set forth hereinafter.

SUMMARY OF THE INVENTION

In accordance with the invention, the seal arrangement is provided in the described environment by a seal rotor arranged to rotate with the impeller shaft and an annular seal stator around the rotor, with opposing faces of the rotor and stator forming a dynamic seal having one end of the axial extent of the seal exposed to the compressor discharge pressure space and the other end of the axial extent of the seal exposed to the sump chamber space, and means are provided to define a venting passage from an intermediate location along the axial extent of the seal, with the passage extending inwardly into the rotor and to the inlet side of the impeller, with the venting passage having a lower resistance to fluid flow than the resistance to fluid flow between the intermediate location along the axial extent of the seal and either end of the seal.

DRAWING DESCRIPTION

DESCRIPTION OF THE PREFERRED EMBODIMENTS

Figure 1:
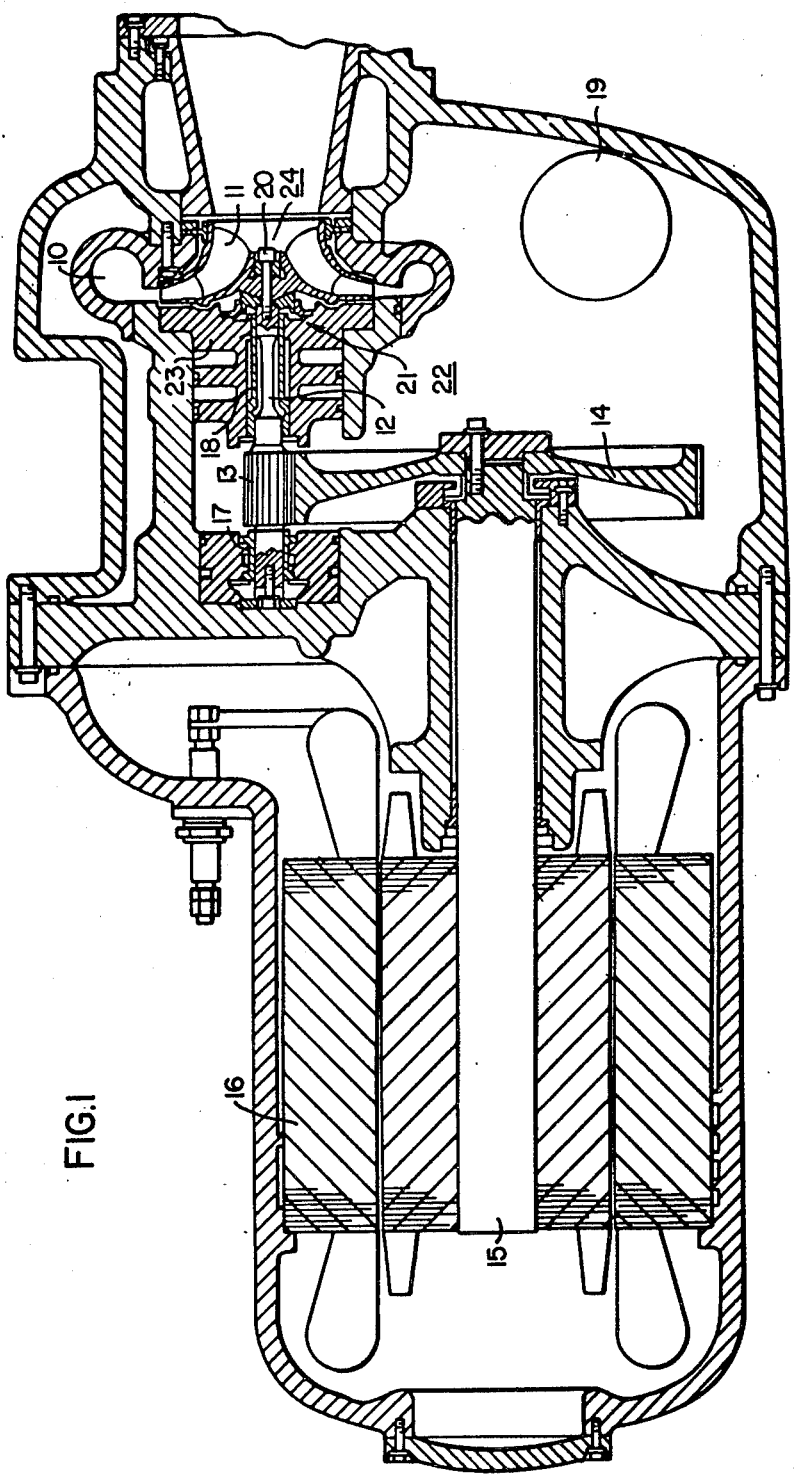
FIG. 1 is a longitudinal sectional view of a centrifugal gas compressor assembly of one type in which the invention may be incorporated.

The centrifugal compressor assembly illustrated in FIG. 1 is of a design in which compactness is considered an important feature. This is achieved in part by the use of a relatively small, but high speed, compressor arrangement. The compressor impeller in the particular arrangement illustrated is driven currently at a nominal speed of 34,000 rpm. After a brief description of the main parts of the compressor assembly of FIG. 1, the significance of the compactness relative to the invention will be discussed.

The illustrated assembly includes a compressed gas collecting scroll 10 with a shrouded centrifugal impeller 11 concentric therewith secured to the end of a rotatable shaft 12 rotated by its pinion gear 13 which is in turn driven by bull gear 14 on the shaft 15 of motor 16.

The shaft 12 for driving impeller 11 is journaled in bearings 17 and 18, which are hydrodynamic journal bearings providing full film lubrication and are fed with oil derived from an oil pump-separator 19 (which will be described later) through oil feedlines not shown. The impeller 11 is attached to the shaft 12 by an impeller retaining bolt 20 and other parts which friction key the impeller to the shaft in accordance with the general arrangement described in U.S. Pat. No. 3,601,501.

The seal arrangement according to the invention is located in the area designated 21 in FIG. 1 and the importance of a reasonably good seal at this location separating the high pressure or scroll chamber area 10 from the interior space 22 of the sump chamber will be described in connection with FIG. 2.

Figure 2:
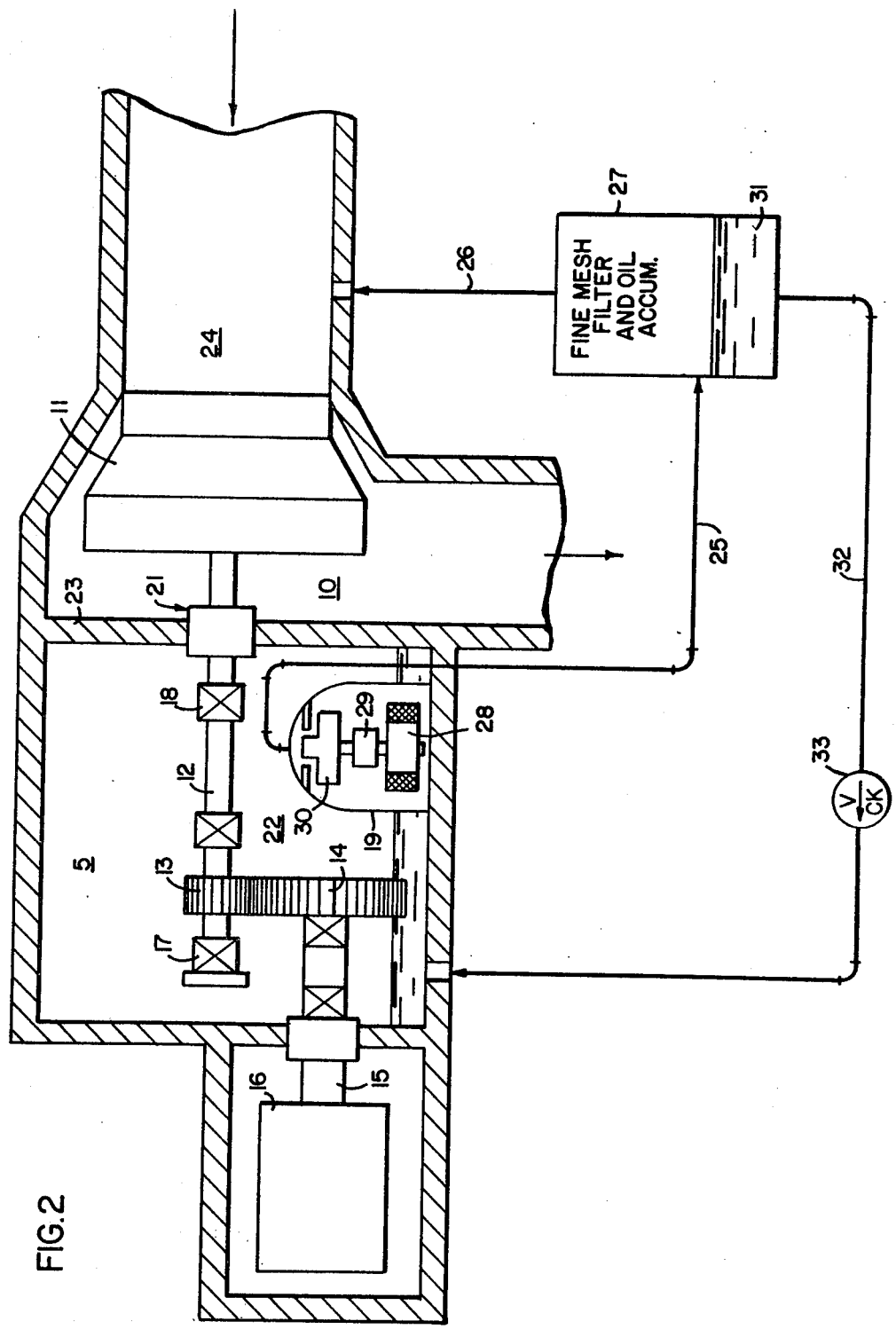
FIG. 2 is a generally schematic view of the parts of a refrigerant system in which the invention is particularly applicable.

In FIG. 2, the sump chamber space 22 and any space therein in communication with the space 22 is shown as being separated from the high pressure discharge space 10 by a casing wall 23 provided with the seal 21 in the opening in the wall through which the driving shaft 12 for the impeller 11 projects.

In the particular compressor assembly design used as an example for purposes of description, the compressor discharge space 10 (FIGS. 1 and 2) in normal operation will normally have a pressure of say 65 p.s.i.g. (the undiffused static pressure at the impeller discharge), and to which the one side of the seal 21 is exposed, while the pressure in the sump chamber 22 will nominally be 35 p.s.i.g., with the other side of the seal 21 exposed to this pressure. With these values, a pressure differential of 30 p.s.i. is available to drive refrigerant gas from the discharge pressure space 10 to the sump chamber space 22. The sump chamber space 22 is maintained at substantially the same pressure as the suction pressure at the inlet 24 at the eye of the impeller through the connecting lines 25 and 26 which connect the oil-refrigerant separator to a fine mesh filter and oil accumulator 27 and the filter-accumulator to the suction side of the compressor, respectively. The entire refrigerant loop is hermetically closed and the lowest pressure in this loop is that at the compressor impeller inlet or suction pressure. Therefore, the leakage of refrigerant gas through the seal 21 is required to be returned to the refrigerant system and this is accomplished by the oil pump-separator 19 which includes an electric motor 28 driving a gear pump 29 for pumping oil to the bearings in the sump chamber, and a driven oil—refrigerant separator 30 which is intended to remove large particles of oil from the refrigerant and vent the refrigerant through the line 25 to the filter and oil accumulator 27.

In normal operation of the compressor assembly the gear arrangement of the drive train generates voluminous oil mist particles which are in part entrained in refrigerant leakage into the sump chamber 22. The larger oil particles are prevented from being vented along with the refrigerant back to the refrigerant system by the centrifugal oil—refrigerant separator 30 but some of the small oil mist particles, such as those which are 2 microns or smaller, are not separated but escape through the line 25 to the filter and oil accumulator 27. This filter is provided with a filter medium which for the most part prevents the passage of those particles greater than 0.4 microns through the vent line 26 to the refrigerant system. However, these separated oil particles are stored in the accumulator portion 31 and can be drained back to the sump chamber only during compressor shutdown through the drain line 32 containing a check valve 33. In that connection it is noted that FIG. 2 is a schematic view and that the filter and accumulator 27 is located to permit gravity drain back to the sump chamber through the line 32.

The desirability of having an effective seal 21 arises in large part from the compactness of the sump chamber. With the relatively compact sump chamber, which is desirable in connection with the overall compactness of the compressor assembly, the oil capacity in the sump chamber is limited. For example with a centrifugal compressor of the compact size having approximately a 100-ton refrigeration producing capacity, in the particular illustrated arrangement the oil capacity is limited to approximately 2 gallons. The limited size sump chamber also imposes a disadvantage in that the internal surface area in the sump chamber upon which oil mist can coalesce is relatively limited as contrasted to units with larger sump chambers. In the compact size units the total amount of oil present in the chamber is so limited that the oil which is not coalesced on surfaces is subject to being entrained by the refrigerant gas being vented back to the refrigerant system. Since the rate of oil carry-out is generally proportional to the refrigerant venting rate the result is that in a shorter time period than is desirable sufficient oil has been moved into the accumulator 27 by the venting refrigerant gas that a shutdown of the system is required to permit drainage of the oil from the accumulator back to the sump chamber. While in larger units of this general design a sump pump and venting is also provided, there is no requirement for the filter 27 because the larger oil capacity in the sump chamber permits a greater venting loss of oil and larger periods of time between shutdown of the compressor. Thus, in addition to the disadvantage of the limited time intervals between shutdowns, the compact centrifugal compressor has the further disadvantage of requiring the use of the fine mesh filter and oil accumulator device 27. From this it will be appreciated that if refrigerant leakage from the high pressure chamber to the sump chamber can be substantially reduced, the noted disadvantages can be substantially avoided. The seal arrangement of the invention is intended to accomplish this, particularly in the noted environment of a compact centrifugal refrigerant compressor. The seal arrangement is also of a reasonably low cost and does not disturb the basic design parameters of the centrifugal compressor assembly having the general impeller and shaft arrangement disclosed in U.S. Pat. No. 3,601,501.

Figure 3:
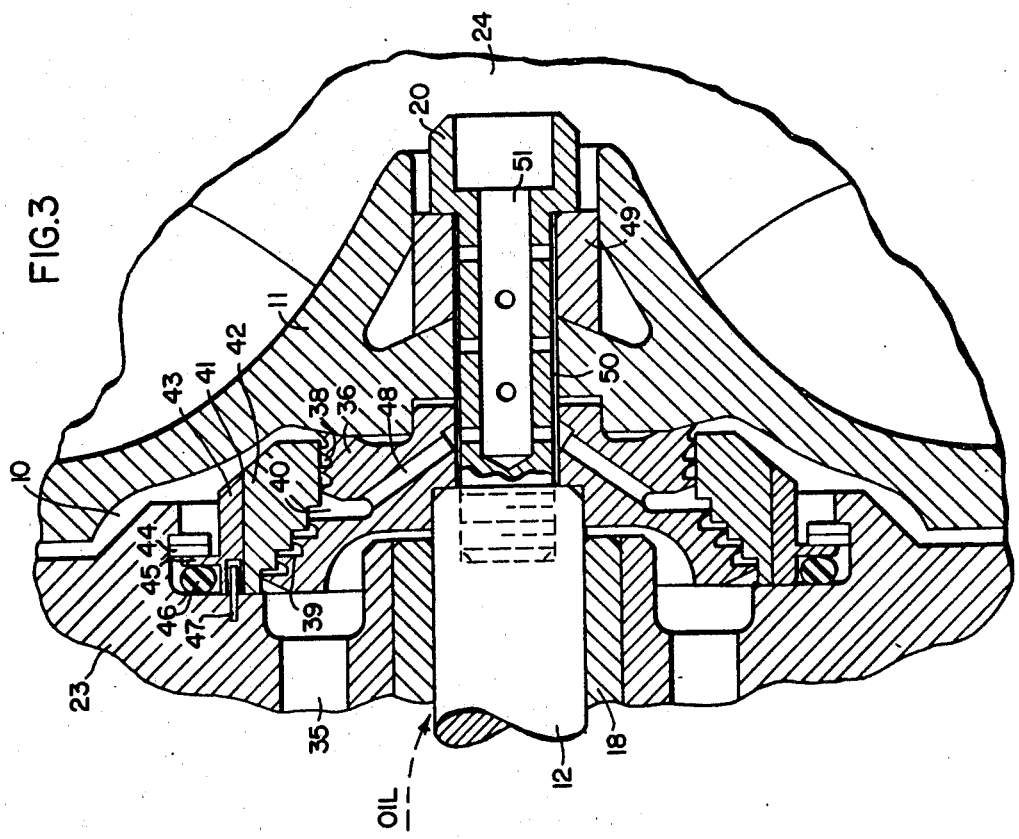
FIG. 3 is a sectional view, enlarged relative to the showing of FIG. 1, of one form of seal arrangement as incorporated in the impeller, shaft, and casing construction according to the invention.

In the illustrated seal arrangement of FIG. 3 the shaft 12 is supported by the hydrodynamic journal bearing 18 to which oil is fed in the direction indicated by the dash line arrow under pressure from the pump 29 (FIG. 2) to provide a full film lubrication, with the oil then passing into the oil cavity 35 which is in turn connected by means not shown to drain to the sump of the sump chamber 22. Accordingly the oil cavities are at the same pressure as the interior of the sump chamber, which in the example is approximately 35 p.s.i.g.

The seal rotor part 36 (FIG. 3) has the general shape of a circular washer with a stepped opening therein. The shoulder of the counter bored part of the stepped opening seats on the end of shaft 12. The outer circumference of the seal rotor 36 includes one portion 38 extending in a generally axial direction and provided with labyrinth teeth thereon and an outwardly, obliquely directed portion 39 also provided with labyrinth teeth thereon, these two portions being separated at an intermediate location along the total axial extent of the outer circumference of the rotor by a circumferential groove or channel 40.

The seal stator 41 (FIG. 3) has the general shape of a ring which encircles the seal rotor 36 and includes in its currently preferred form an inner ring 42 of carbon graphite which is shrunk fit in a steel outer retaining ring 43. The inner surface of the ring 42 is shaped to accommodate the profile formed by the tips of the teeth on the seal rotor. The seal stator is secured in position to the casing 23 by retaining rings 44 engaging a circumferential flange 45 of the ring 43, the flange in turn compressing an O-ring secondary seal 46 in the currently preferred construction. An anti-rotation pin 47 locking the outer section of the seal stator against rotation relative to the casing 23 may also be provided.

It will be appreciated from the description and from FIG. 3 that the dynamic seal thus provided by the seal rotor and seal stator has an axial extent which includes the one portion 38 and the other portion 39 separated by the intermediate location circumferential channel 40.

The rotor 36 (FIG. 3) has a plurality of bores 48 which extend from the channel 40 to an annular clearance space 50 defined between the shank 37 of the retaining bolt and the surrounding structure including the seal rotor 36, the hub of impeller 11, and a ring-shaped spacer 49. It is noted that the impeller and shaft assembly as a whole is of the general arrangement described in U.S. Patent 3,601,501 which results in the impeller being friction keyed to the shaft 12 and permits the clearance space 50 noted. While the size and shape of the illustrated rotor 36 dictates that the bores 48 extend obliquely, in rotors of other shapes or larger sizes they could be directly radial. In any case, the bores of this particular invention include radial components.

An axial bore 51 (FIG. 3) is provided in the retainer bolt 20 and a plurality of radially directed transverse bores 52 place the axial bore in communication with the clearance space 50 and with the rotor bores 48. Thus, a venting passage for refrigerant gas leaking into the seal from the high pressure space is provided from an intermediate location along the leakage path of the dynamic seal to the space 24 at the inlet or suction side of the impeller.

It is considered important in the particular centrifugal compressor assembly in which the seal arrangement is described as being incorporated that the labyrinth seal be manufactured with a relatively close clearance. Satisfactory results have been obtained by constructing the seal stator with an inside diameter of the carbon graphite ring being such that, as assembled to the seal rotor, a 0 to 0.002 inch diametral clearance exists between the stator and rotor. During the first few seconds of operation the sharp metal labyrinth teeth rapidly cut from the carbon what is needed, but no more. This wear-in occurs because the seal stator is clamped (non-floating) at assembly with the seal rotor as a guide. In addition the characteristics of the particular machine are such that the shaft will move radially a few mils in going from its position at assembly to its normal position at operating speed. This radial shift of the rotational centerline arises from differential thermal expansions occurring in the main bearings and from a shift of position of the rotating shaft within the journal bearings reflecting oil film thickness changes. The relatively close tolerances of the seal arrangement are considered to be important to insure that each portion of the labyrinth seal, 38 and 39 (FIG. 3) has a higher gas flow resistance than the internal vent passage leading from the intermediate location along the seal to the inlet space 24.

The way in which the seal arrangement works is as follows. In normal operation a pressure of, say, 65 p.s.i.g. exists at the impeller or high pressure side 10 (FIG. 3) of the seal arrangement while a pressure of, say, 35 p.s.i.g. exists at the other side of the seal arrangement exposed to the oil cavity 35. The pressure in the annular groove 40 at the intermediate location will be only slightly greater than the pressure at the suction side of the impeller, which as was noted, is substantially the same as that in the oil cavity 35. For example the pressure at the intermediate location 40 at the annular groove may be in the order of 36 or 37 p.s.i.g., and with the relatively low flow resistance of the vent passage, most of the refrigerant gas leakage which reaches the intermediate location is returned to the suction side of the impeller rather than going through the relatively high resistance leakage path of the portion 39 of the seal leading to the oil cavity 35. In testing it has been determined that the ratios of reduction of leakage into the oil cavity with the illustrated arrangement, over the seal presently in use, ranged from about 1 to 10 to 1 to 20 depending upon the clearances between the rotor teeth and the stator.

It is currently believed preferable that the portion 39 (FIG. 3) of the seal be obliquely disposed as illustrated, rather than extending axially as the other portion 38. The reason for this will be better understood in light of the following remarks. In normal operation of the compressor the pressures are the noted nominal pressures of 65 p.s.i.g. discharge and 35 p.s.i.g. at the inlet to the impeller and in the sump chamber. However, when the compressor is shut down for a sufficient period to equalize the pressures throughout this hermetically closed system, the pressures throughout the system will be in order of about 80 p.s.i.g. Thus upon start-up of the compressor the discharge pressure is lower than the sump pressure for a short time, such as 10 seconds. This is due to the lesser restriction of the refrigeration system as a whole relative to the restriction of the communicating lines from the sump chamber to the refrigeration system. As a result, upon start-up there can exist a reverse pressure gradient across the seal which could tend to permit oil leakage back through the seal into the refrigerant system. By providing the oblique disposition of the seal portion 39, centrifugal force in enlisted to "throw-back" oil which might tend to leak back through the seal.

While the seal illustrated in FIG. 3 provides the noted significant reduction in leakage in the range of operating speeds currently used, with possible increases to higher operating speeds in the future, greater rates of leakage than occur with the current operating speeds can be expected. The projected increased leakage will result from the generally radially directed bores 48 (FIG. 3) in the seal rotor 36 producing a pumping action as if they formed a small centrifugal compressor. While this pumping action may be considered, on balance, to be advantageous to prevent reverse leakage in an installation operated normally with an appreciable number of starts and stops, this does not apply to a system intended for mostly continuous operation with infrequent shutdowns. In the illustrated arrangement the pumping action can produce a pressure of say 5 p.s.i. higher than the compressor suction pressure at the current nominal operating speeds. Because the low pressure side of the seal is at the same compressor suction pressure, there is then a 5 p.s.i. pressure difference available to drive refrigerant leakage from the annular groove 40 through the second portion 39 of the seal and into the sump chamber. While this leakage is not objectionably large at the nominal 30,000 to 32,000 rpm operating speed of the compressor, the leakage will increase with increased speeds and thus would become significantly higher with higher operating speeds. This stems from the leakage increasing with compressor speed changes from midrange speeds, such as 10,000 to 20,000 rpm, up to and above the nominal operating speed.

Figure 4:
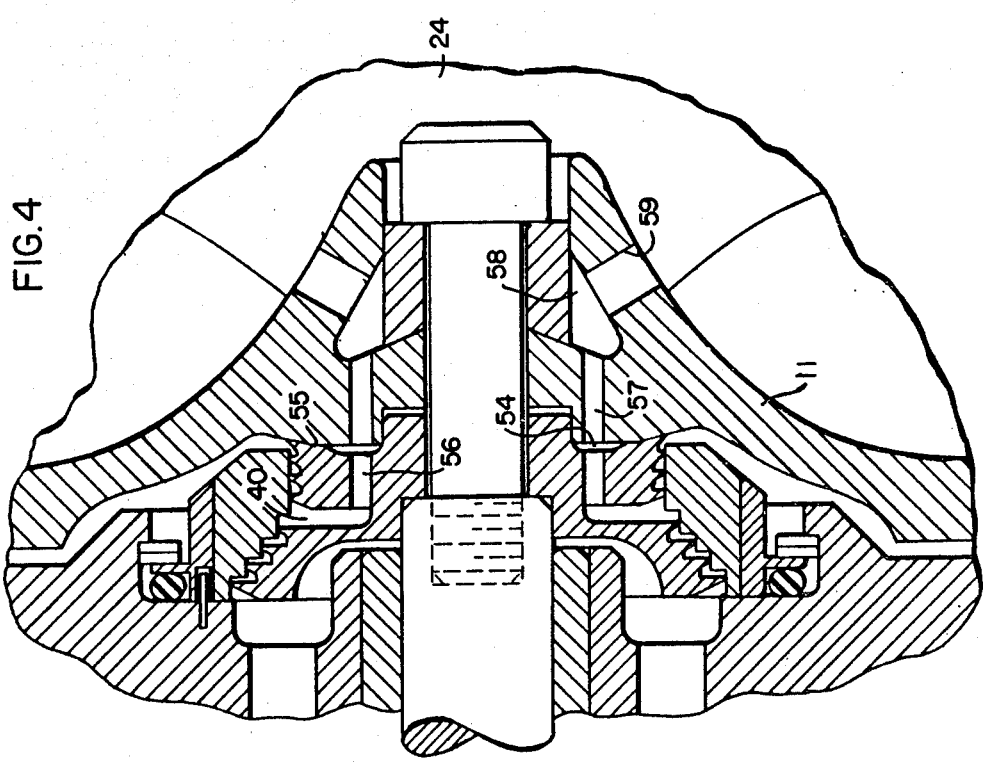
FIG. 4 is a view similar to FIG. 3 and illustrating a form of the invention which is currently believed may be a preferred mode of carrying out the invention and incorporating the improvements contributed jointly by myself and Raimondi and claimed in that noted joint patent application.
Figure 5:
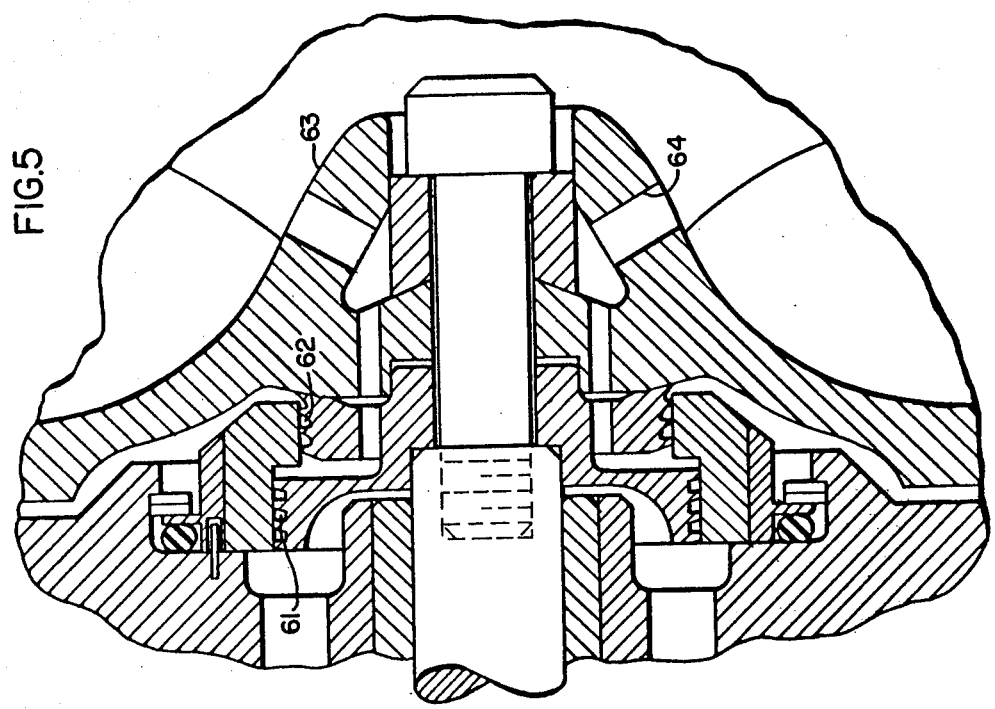
FIG. 5 is a view similar to that of FIG. 4 and showing a modification of the arrangement of FIG. 4.

The constructions illustrated in FIGS. 4 and 5, and which are the subject of the noted companion application of this applicant and Raimondi, are such that the adverse rising-leakage/speed characteristic at such speeds is substantially eliminated, and also yields a further reduction in leakage at the current operating speeds. Further, the constructions are such that all portions of the venting passage formed in the retaining bolt 20 are eliminated so there is no chance of weakening of the retaining bolt. It is noted that those parts of the assembly in FIGS. 4 and 5 which are of the same structure as in FIG. 3 are given identical numerals to the extent they are identified by numerals.

The general concept of the arrangements in FIGS. 4 and 5 incorporates the elimination of radial bores in the seal rotor and the addition of what are termed scavenging vent holes provided in the vent passage from the seal to the inlet space of the compressor.

The stator construction of FIG. 4 is the same as that of FIG. 3. The rotor 55 differs in that the radially inner portion of the annular channel 40 is connected through a plurality of axially-extending bores 56 spaced around the rotor, rather than radially-extending bores as in the rotor 36 of FIG. 3. These axially extending bores communicate with axially extending bores 57 in the hub of impeller 11, through the small annular cavity 54 between the two sets of axial holes, i.e. between the seal rotor and impeller hub. These bores 57 also communicate with the annular cavity 58 inside the impeller hub which in turn communicates with a plurality of radially outwardly directed bores 59 which open to the suction or inlet side 24 of the impeller. These bores 59 serve as a small centrifugal compressor which in effect pump down the vent passageway back to the annular groove 40 and thus lower the gas pressure in the annular groove 40. Thus this arrangement may be logically termed as a scavenging-vent passage arrangement in that the leakage gas is drawn rather than simply vented.

The arrangement shown in FIG. 5 differs from that shown in FIG. 4 in two main respects. First, the seal portions 61 and 62 both extend axially only. The expected advantage of this is that the seal is less sensitive to axial motions of the shaft which can occur during operation and enables looser control of machine tolerances which affect axial positioning. The second labyrinth stage 62 however is located at a larger radius than the first labyrinth stage 61 of the seal to thereby use centrifugal acceleration to prevent ingress of oil during start-up. Another advantage of the parallel, two stage seal, as distinguished from the seals of FIGS. 3 and 4 which include at least one oblique stage, is that the number of diameters to be machined are reduced. Since the machining must be to relatively close tolerances, such as 1 mil, the reduction in the number of diameters provides a cost advantage.

The other difference of the arrangement of FIG. 5 is that the upstream portion of the hub of the impeller 63 is thickened so that the pumping bores 64 therein may be increased in radial extent. This provides a stronger pumping action and is believed to be possibly useful in an arrangement in which it is intended that the seal have zero or reverse leakage during normal operation. It is noted that this arrangement of reverse leakage is not considered desirable in a centrifugal refrigerant compressor of the general type described since this would encourage oil leakage from the sump chamber back through the seal. However, such a reverse leakage arrangement may be desirable in the pumping of toxic or gases subject to being radioactively contaminated.

I claim:

1. In an improved arrangement for inhibiting refrigerant leakage between the discharge pressure space of a centrifugal refrigerant compressor which has an impeller with an inlet side and which is driven by a shaft, and the interior space of a sump chamber containing machinery for driving said shaft, through a leakage path defined between radially outer surfaces of a seal rotor and facing radially inner surfaces of a seal stator, said rotor being fixed for rotation with said shaft and said stator being stationary, said rotor and stator being disposed with one end of said leakage path being in communication with said discharge pressure space and the other end of said leakage path being in communication with said interior space of the sump chamber, the improvement comprising means defining a refrigerant venting passage from an intermediate point along said leakage path to the space at said inlet side of said impeller, said venting passage having a lower resistance to fluid flow than the resistance to fluid flow imposed by those parts of said leakage path between said intermediate point and either end of said leakage path, and having at least a portion of said venting passage extending inwardly into said seal rotor.

* * * * *